United States Patent
Cheung et al.

(10) Patent No.: US 7,299,471 B2
(45) Date of Patent: Nov. 20, 2007

(54) COMMON THREAD SERVER

(75) Inventors: Tom Thuan Cheung, San Jose, CA (US); Siyi Terry Donn, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 10/125,048

(22) Filed: Apr. 17, 2002

(65) Prior Publication Data

US 2003/0200253 A1 Oct. 23, 2003

(51) Int. Cl.
*G06F 9/00* (2006.01)
(52) U.S. Cl. .................. 718/107; 718/100; 718/106
(58) Field of Classification Search .............. 718/100, 718/107
See application file for complete search history.

(56) References Cited

U.S. PATENT DOCUMENTS

| | | | |
|---|---|---|---|
| 5,129,086 A | | 7/1992 | Coyle, Jr. et al. ........... 395/650 |
| 5,630,136 A | * | 5/1997 | Davidson et al. ........... 718/106 |
| 5,951,653 A | * | 9/1999 | Hill et al. ................... 719/315 |
| 6,125,382 A | * | 9/2000 | Brobst et al. ............... 718/102 |
| 6,260,077 B1 | | 7/2001 | Rangarajan et al. ........ 709/328 |
| 6,857,122 B1 | * | 2/2005 | Takeda et al. .............. 718/107 |
| 2002/0073135 A1 | * | 6/2002 | Meyer ......................... 709/107 |

* cited by examiner

*Primary Examiner*—William Thomson
*Assistant Examiner*—Phuong N Hoang
(74) *Attorney, Agent, or Firm*—Min, Hsieh & Hack, LLP

(57) ABSTRACT

Disclosed are a method, system, and program product for calling a Common Thread Object from a running process. This is done by comprising invoking a Thread Invocation Object from the running process; creating a Generic Request Object from the Thread Invocation Object and populating the Generic Request Object with Common Thread Object and running process data; and passing data from the Generic Request Object to the Common Thread Object to initiate the common thread task.

9 Claims, 4 Drawing Sheets

COMMON THREAD SERVER

FIELD OF THE INVENTION

Figure 1:
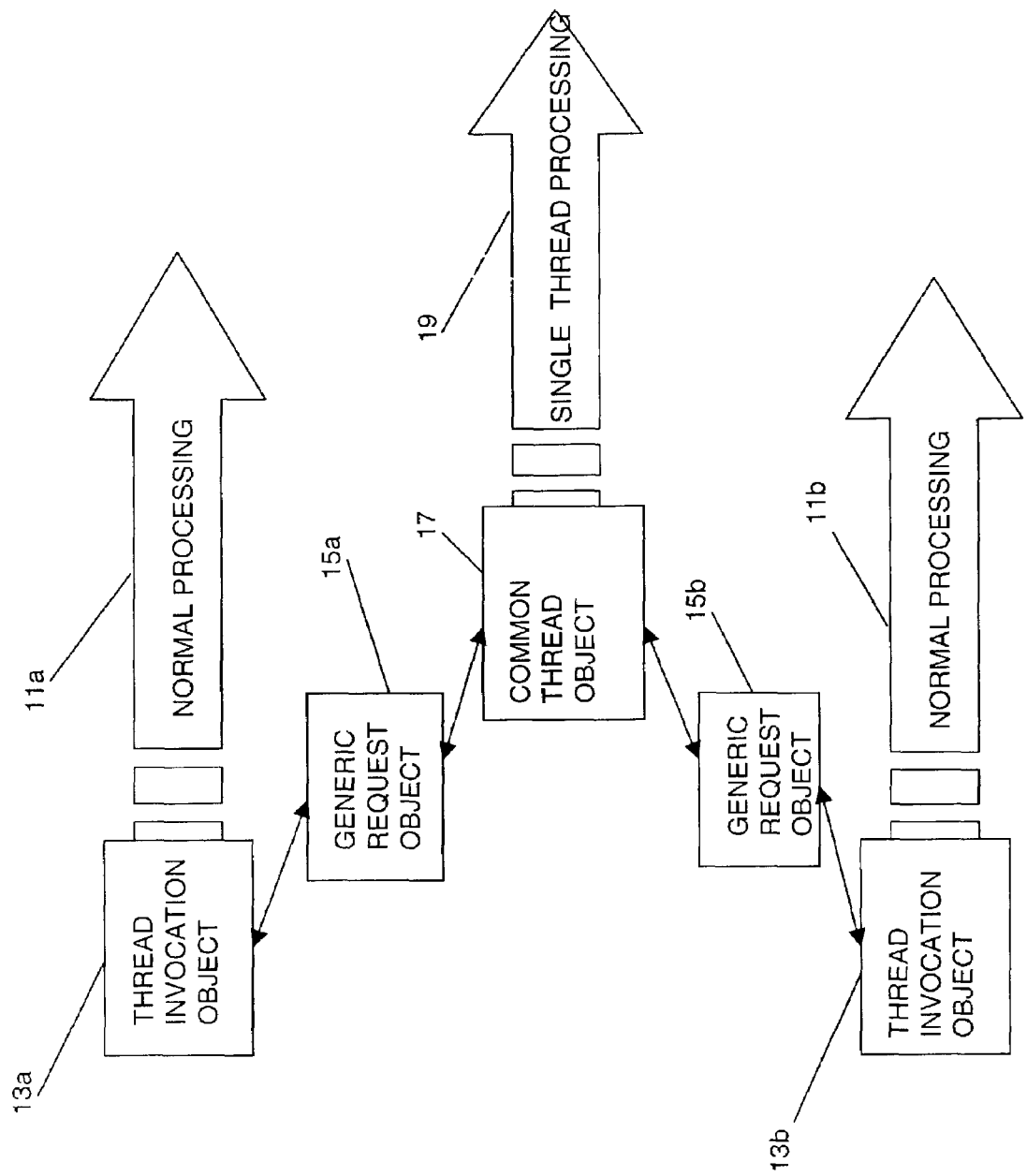

Our invention relates to dividing the processor bandwidth of a computer between multiple threads or sub-processes, including saving and restoring state data (i.e., context) of a task, process, or thread in a multitasking system. In this regard, our invention relates to managing or supervising a switch between discrete threads.

DEFINITIONS

As used herein, a "thread" is a container for information associated with a single use of a program that can handle multiple concurrent users. From the program's point-of-view, the thread is the information needed to serve one individual user or a particular service request.

As used herein, a "thread-safe" routine is a routine that can be called from multiple programming threads without unwanted interaction between the threads. "Thread-safety" is a term used to describe a property of a routine that can be called from multiple programming threads without unwanted interaction between the threads.

As used herein an "application program interface" or "API" is the set of routines that a program uses to request and carry out tasks. The requesting program is typically a higher level program, as an application program, and the tasks are typically lower level tasks, as operating system tasks and maintenance chores such as managing files and displaying information on the display. The application program interface is the vehicle through which the application program communicates requests for these services.

BACKGROUND OF THE INVENTION

A "thread" is the basic unit of CPU (central processing unit) utilization. An individual thread has little non-shared state, usually just its own register state and its own stack. Normally, a group of peer threads share code, address space, and operating system resources. The environment in which a thread executes is called a task. A task does nothing if it does not contain threads, and a thread can only be in one task.

The "thread" functions as a placeholder or container for information associated with a single user of a program that can handle multiple concurrent users. From the program's point-of-view, the thread is the information needed to serve the one individual user or a particular service request. If multiple users are using the program or concurrent requests from other programs occur, a separate thread is created and maintained for each of them. The thread allows a program to know which user is being served as the program alternately gets re-entered on behalf of different users. (One way in which thread information is kept is by storing it in a special data area and putting the address of that data area in a register. The operating system always saves the contents of the register when the program is interrupted and restores it when it gives the program control again.)

In the context of "threads" and "tasks" and "multitasking" and "multithreading," "multithreading" and "tasks" are often confused. As used herein, "tasks" are made up of and contain one or more "threads." Multiple tasks may be instantiated and appear to be running simultaneously. While some computers can only execute one program instruction at a time, because they operate so fast, they appear to run many programs and serve many users simultaneously. The computer operating system gives each program a "turn" at running, then, based upon various external and internal events or happenings, the operating system requires the current program or task to wait while another program gets a turn. Each of these programs is viewed by the operating system as a "task" for which certain resources are identified and kept track of. The operating system manages each application program as a separate task and lets the user look at and control items on a "task list."

By way of illustration, if the program initiates an I/O request, such as reading a file or writing to a printer, it creates a thread so that the program will be reentered at the right place when the I/O operation completes. Meanwhile, other concurrent uses of the program are maintained on other threads. The extensive sharing of code, address space, and operating system resources among threads make the creation of threads and switching between threads relatively inexpensive in terms of computer resources.

Moreover, most modern operating systems provide support for both multitasking and multithreading. They also allow multithreading within program processes so that the system is saved the overhead of creating a new process for each thread.

Another aspect of multi-thread operations is "thread safety." As used herein, "thread-safe" is a term used to describe a routine that can be called from multiple programming threads without unwanted interaction between the threads. Thread safety is of particular importance to Java programmers, since Java is a programming language that provides built-in support for threads. By using thread-safe routines, the risk that one thread will interfere and modify data elements of another thread is eliminated by circumventing potential data race situations with coordinated access to shared data.

It is possible to ensure that a routine is thread-safe by making sure that concurrent threads use synchronized algorithms that cooperate with each other, and confining the address of a shared object to one thread whenever an unsynchronized algorithm is active.

Modern operating systems typically provide a set of application program interfaces that allow a programmer to include thread support in a program. Higher-level program development tools and application subsystems and "middleware" also offer thread management facilities. Object-oriented programming languages also accommodate and encourage multithreading in several ways. For example, Java supports multithreading by including synchronization modifiers in the language syntax, by providing classes developed for multithreading that can be inherited by other classes, and by doing background "garbage collection" (recovering data areas that are no longer being used) for multiple threads.

One particular challenge is multi-threading in the context of single-threaded code logic. Moreover, single threaded logic is non-trivial. It is the low level low level glue that provides I/O, opening and closing files, writing output to the monitor, printer, and diskdrives, services interrupts, traps exceptions, and the like. The single threaded logic applications provide vital substance to the high level applications. Single-threaded code logic is usually in the form of APIs or subroutines that have areas of memory or variables that cannot be shared by multiple threads of execution simultaneously. This is usually due to fixed memory addressing logic and/or shared resource usage. The problem arises because calling a single threaded application from within a multi-threaded process or sub-process can cause memory over-writes and other problems. The single threaded application is not "thread safe." Thus, a need exists for the capability of incorporating single-threaded code logic into a multi-threaded software environment.

SUMMARY OF THE INVENTION

Our invention meets this challenge by providing a data flow design, method, system, process and program product that facilitates incorporating single-threaded code logic into a multi-threaded software environment. We call this capability the Common Thread Server. The basis of the Common Thread Server is to uniquely serialize the invocation of the single-threaded code logic by multiple threads of execution within a single process space.

We accomplish this by calling a single thread process from a running process. This is done by invoking a call from the running process. This invocation creates a request (container in object oriented terminology) from the call and directly or indirectly populates the request (container) with single thread process and running process data. That is, the single thread process and running process data may be supplied by and/or called from the thread invocation object or the common thread object or a repository. Next, the method passes data from the request (container) to the single thread process to initiate the common thread process.

In an object oriented environment, serialization of the invocation of single thread code logic is accomplished through the following simplified constructs:
(A) Thread Invocation Object
(B) Generic Request Object
(C) Common Thread Object According to our invention, an executing process wishing to invoke a single threaded process (a Common Thread Object process) first invokes a Thread Invocation Object. The Thread Invocation Object may either create and populate a Generic Request Object, as a container, with data, or set a flag or generate a signal to have or request the Common Thread Object populate the Generic Request Object. The Generic Request Object is used to encompass all possible requests that need to be processed by the Common Thread Object. The data carried by the Generic Request Object (whether supplied by the Thread Invocation Object or the Common Thread Object or both of them) is program and Common Thread Object data, and includes, at a minimum, a reference to the calling Thread Invocation Object, the request name, an empty results object, and an array of parameter objects. This is a private data class used within the Common Thread Object. This data is passed from the Generic Request Object, as a container, to the Common Thread Object to initiate the common thread task.

The Common Thread Object is the single thread of execution solely responsible for invocation of the single-threaded code logic. It processes Generic Request Objects in a predetermined order (FIFO, assigned priority, etc).

The Thread Invocation Object represents a thread of execution that is registered with the Common Thread Object. The Thread Invocation Object sends a request to be processed via a reference call to the Common Thread Object, waits until the request is completed and then immediately evaluates the result.

THE FIGURES

Various aspects of our invention are illustrated in the FIGURES appended hereto.

FIG. 1 illustrates the environment of the invention, with two running processes, 11a, 11b, seeking to access a single thread process, 19, through associated Thread Invocation Objects, 13a, 13b, and Generic Request Objects, 15a, 15b, as containers of invocation data, to a Common Thread Object, 17.

Figure 2:
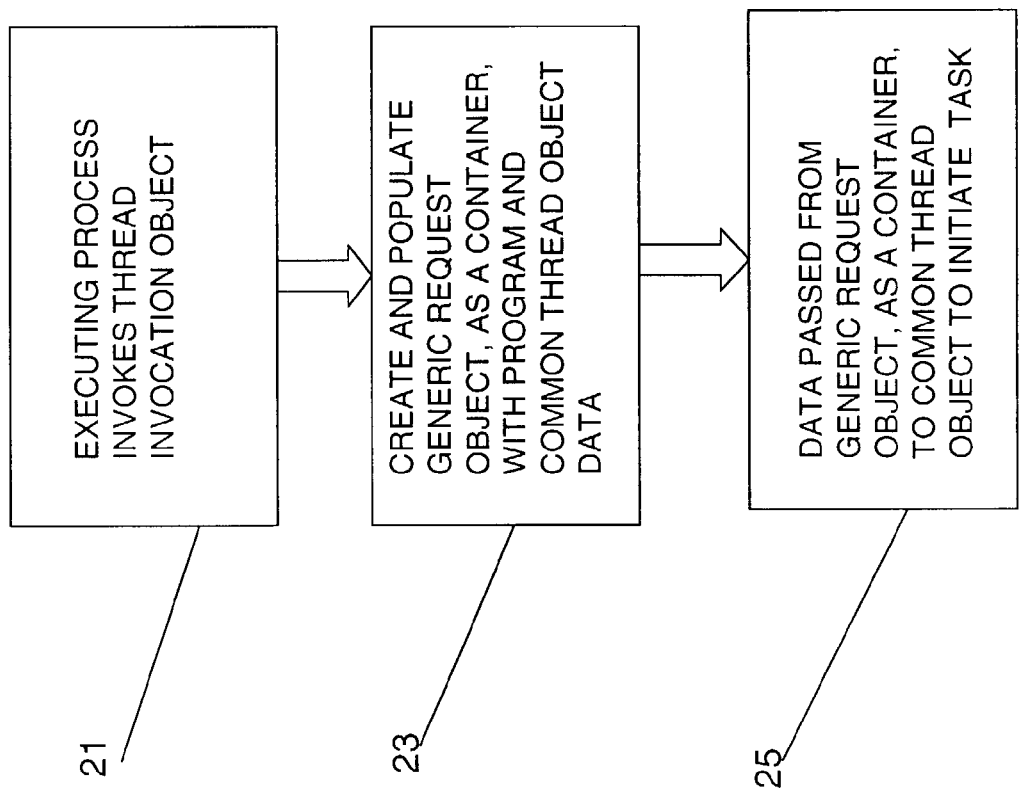
Figure 3:
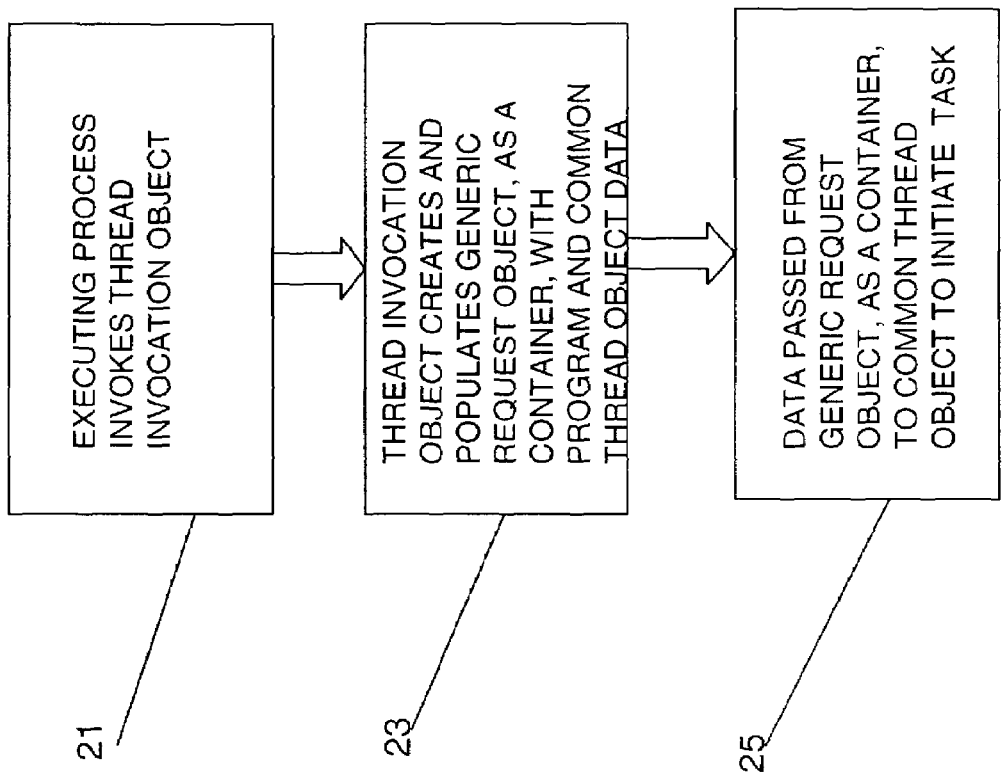

FIG. 2 illustrates a high level flow chart for the method, system, and program product of the invention. Specifically, in block 21 an executing process invokes a Thread Invocation Object. Next, as shown in block 23, one or both of the Thread Invocation Object and the Common Thread Object, 17, create and populate a Generic Request Object, as a container, with program and Common Thread Object data. Next, as shown in block 25, this data is passed from Generic Request Object, as a container, to the Common Thread Object to initiate the single thread task FIG. 3 illustrates a flow chart for a more specific exemplification of the method, system, and program product of the invention where the Thread Invocation Object drives the process. Specifically, in block 21 an executing process invokes a Thread Invocation Object. Next, as shown in block 23, the Thread Invocation Object creates and populates a Generic Request Object, as a container, with program and Common Thread Object data. Next, as shown in block 25, this data is passed from Generic Request Object, as a container, to the Common Thread Object to initiate the single thread task.

Figure 4:
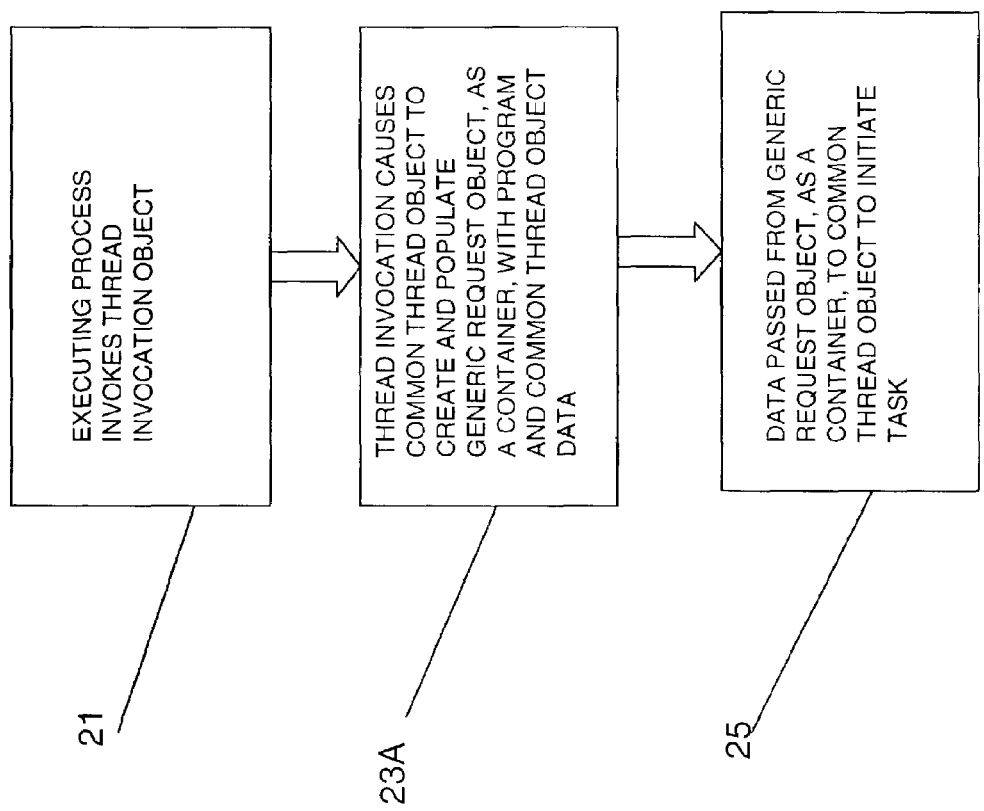

FIG. 4 illustrates a flow chart for the method, system, and program product of the invention where the Thread Invocation Object initiates the process and the Common Thread Object drives the process once initiated. Specifically, in block 21 an executing process invokes a Thread Invocation Object Next, as shown in block 23a, the Thread Invocation Object sets a flag or other signal or register that calls upon the Common Thread Object to create and populate a Generic Request Object, as a container, with program and Common Thread Object data. Next, as shown in block 25, this data is passed from Generic Request Object, as a container, to the Common Thread Object to initiate the single thread task.

DETAILED DESCRIPTION OF THE INVENTION

The basis of our Common Thread Server lies in serializing the invocation of the single-threaded code logic by multiple threads of execution within a single process space. This is accomplished through the use of the following constructs:
(A) Thread Invocation Object
(B) Generic Request Object
(C) Common Thread Object FIG. 1 illustrates the environment of the invention. Specifically, FIG. 1 illustrates two running processes, 11a, 11b. Both processes, 11a, 11b, are capable of accessing a single thread process, 19. This access is through associated Thread Invocation Objects, 13a, 13b, and Generic Request Objects, 15a, 15b. The Generic Request Objects, 15a, 15b, are containers of invocation data, to be passed between a Thread Invocation Object, 13a or 13b, and a Common Thread Object, 17.

FIG. 2 illustrates one high level flow chart for the method, system, and program product of the invention. Specifically, in block 21 an executing process (as processes 11a and 11b in FIG. 1) invokes a Thread Invocation Object (as elements 13a and 13b in FIG. 1). Next, as shown in block 23, the Thread Invocation Object (as elements 13a and 13b in FIG. 1) initiates the creation and population of a Generic Request Object (as elements 15a and 15b in FIG. 1), as a container or container class, with program and Common Thread Object data. This initiation and population can come about through passing data from the Thread Invocation Object (elements 13*a*, 13*b*), or from the Common Thread Object (as element 17), or both the Thread Invocation Object (elements 13*a*, 13*b*) and the Common Thread Object (element 17). Next, as shown in block 25, this data is passed from Generic Request Object, (elements 15*a* and 15*b* in FIG. 1), as a container, to the Common Thread Object (element 17) to initiate the single thread task (element 19).

The Common Thread Object, 17, is the single thread of execution solely responsible for invocation of the single-threaded code logic. The Common Thread Object, 17, processes Generic Request Objects in a predetermined order (FIFO, priority, etc.). As each request is issued by a Thread Invocation Object, 13*a*, 13*b*, the request is independently processed. The results are returned to the calling Thread Invocation Object, 13*a* or 13*b*. Each Thread Invocation Object. 13*a*, 13*b*, is registered with the Common Thread Object, 17. When there are no more registered Thread Invocation Objects, the Common Thread Object cleans itself and terminates.

The Generic Request Object, 15*a*, 15*b*, is used to encompass all possible requests that need to be processed by the Common Thread Object, 17 It minimally consists of a reference to the calling Thread Invocation Object, the request name, an empty results object, and an array of parameter objects. This is a private data class used within the Common Thread Object, 17. The Generic Request Object, 15*a*, 15*b*, may be initiated as well as populated by a Thread Invocation Objection, 13*a*, 13*b*, or by the Common Thread Object, 17, or by both, with various communication modes between them.

The Thread Invocation Object represents a thread of execution that is registered with the Common Thread Object. It sends a request to be processed via a reference call to the Common Thread Object, 17, waits until the request is completed and then immediately evaluates the result.

In the embodiment shown in FIG. 3 the Thread Invocation Object, 13*a*, 13*b*, directly initiates and populates the Generic Request Object, 15*a*, 15*b*. Specifically, FIG. 1 illustrates a flow chart for one particular embodiment of the method, system, and program product of the invention. Specifically, in block 21 an executing process (as processes 11*a* and 11*b* in FIG. 1) invokes a Thread Invocation Object (as elements 13*a* and 13*b* in FIG. 1). Next, as shown in block 23, the Thread Invocation Object (as elements 13*a* and 13*b* in FIG. 1) initiates the creation and population of a Generic Request Object (as elements 15*a* and 15*b* in FIG. 1), as a container or container class, with program and Common Thread Object data. This initiation and population comes about through passing data from the Thread Invocation Object (elements 13*a*, 13*b*). Next, as shown in block 25, this data is passed from Generic Request Object, (elements 15*a* and 15*b* in FIG. 1), as a container, to the Common Thread Object (element 17) to initiate the single thread task (element 19).

In the embodiment shown in FIG. 4, the Thread Invocation Object, 13*a*, 13*b*, broadcasts or transmits or otherwise sigvalsa request for the Common Thread Object, 17, and the Common Thread Object, 17, initiates and populates the Generic Request Object, 15*a*, 15*b*. FIG. 4 illustrates a flow chart for an alternative exemplification of the method, system, and program product of the invention, where the Common Thread Object, 17, populates the Generic Request Object, 15*a*, 15*b*. Specifically, in block 21 an executing process (as processes 11*a* and 11*b* in FIG. 1) invokes a Thread Invocation Object (as elements 13*a* and 13*b* in FIG. 1). Next, as shown in block 23*a*, the Thread Invocation Object (as elements 13*a* and 13*b* in FIG. 1) initiates the creation and population of a Generic Request Object (as elements 15*a* and 15*b* in FIG. 1), as a container or container class, with program and Common Thread Object data. This initiation and population comes about through passing data from the Common Thread Object (as element 17). Next, as shown in block 25 this_data is passed from Generic Request Object, (elements 15*a* and 15*b* in FIG. 1), as a container, to the Common Thread Object (element 17) to initiate the single thread task (element 19).

The three objects (threadInvocationObject, genericRequestObject, and commonThreadObject) have the pseudocode shown in the Appendix. Specifically, the The threadInvocationObject (represented by elements 13*a* and 13*b* in FIG. 1) references a commonThreadObject and is responsible for interaction with the commonThreadObject for work done on single threaded API calls. That is, it instantiates the commonThreadObject.

The class threadInvocationObject extends thread working through class variables and static commonThreadObject reference. It has constructors, and common thread server specific methods. These include methods for manipulation of commonThreadObject, where each manipulation is uniquely identified by a command (cmd). The current cmd includes initialization and destruction of commonThreadObject, and a private static synchronized void cmdCommonThreadObjectRef(String cmd). Also included is a method to initialize commonThreadObject if necessary. Also included is a private static synchronized void initCommonThreadObject().

A further class is a method to destroy commonThreadObject, and a private static synchronized void destroyCommonThreadObject(). Still further included classes include other methods, unique to specific request, such as an object to contain request parameters and information, all specific requests are to be derived from the base class if using multiple request object classes.

The class genericRequestObject, represented by elements 15*a* and 15*b* in FIG. 1 encompasses class variables as well as exact variables (which will be dependent on request object definition). These are generally for specific solutions, such as public String requestString; public Object[] parameters; public Object requestor (which is a thread invocation object), and public Object result; (which is a result object). Also included are various constructors, and other methods such as set/get methods if necessary.

The class commonThreadObject is an object that executes request for processing of single threaded APIs, and extends the thread, includes the class variable static flag initiallized (which is a flag to indicate that the common thread object has already been initiallized), a private Vector requests, (which is a queue of requests to process), a private Vector threadInvocationObjects (which is a queue of invocation objects), private int references, (which represents the number of invocation objects referencing this object).

The commonThreadObject class also includes constructors and common thread server specific methods, for example, a method to add a request to the request queue so that it can be handled by the commonThreadObject. This method returns a predefined results object. The commonThreadObject class also includes a public Object addRequest(String req, Object[] parameters, Object requester), which is a method to wait for and execute all request in queue one by one.

In a preferred exemplification, the Common Thread Server has the following prerequisites (which makes it compatible with the majority of existing application projects): First, in a preferred exemplification, it uses object oriented program language to more easily map the base components. Synchronization control and inheritance are favorable, however these can be programmed in or worked around.

As used herein, a program product is computer readable program code on one or more media, where the program code is capable of controlling and configuring a computer system having one or more computers to carry out the method of calling a Common Thread Object from a running process by invoking a Thread Invocation Object from the running process, creating a Generic Request Object from the Thread Invocation Object and populating the Generic Request Object with Common Thread Object and running process data; and passing data from the Generic Request Object to the Common Thread Object to initiate the common thread task. The one or more computers may be configured and controlled to carry out the method described herein. Alternatively, the program may be one or more of encrypted or compressed for subsequent installation, and may be resident on installation media or on an installation server.

While our common thread server has been described with respect to certain preferred embodiments and exemplifications, it is not intended to limit the scope of the invention thereby, but solely by the claims appended hereto.

We claim:

1. A method of calling a single thread process from a running process, wherein the single thread process is exclusively invoked by a common thread object, said method comprising:
   a. invoking a call to the single thread process from the running process;
   b. creating a request object container from the call and populating the request object container with common thread object data and running process data from the common thread object;
   c. populating the request object container with the common thread object data and running process data from a thread invocation object associated with the running process; and
   d. passing data from the request object container to the single thread process via the common thread object.

2. The method of claim 1 comprising populating the request object container with the common thread object data and running process data from an object associated with the common thread object.

3. A method of calling a Common Thread Object that exclusively controls invocation of a single-threaded code logic from a running process comprising:
   a. invoking a Thread Invocation Object from the running process;
   b. creating a Generic Request Object as a container from the Thread Invocation Object that is coupled to the Common Thread Object and populating the Generic Request Object with Common Thread Object data and running process data; and
   c. passing data from the Generic Request Object to the single threaded code logic via the Common Thread Object to initiate the single threaded code logic.

4. The method of claim 3 comprising the creating the Generic Request Object as a container from the Thread Invocation Object and populating the Generic Request Object as a container with the Common Thread Object data and running process data from the Thread Invocation Object.

5. The method of claim 3 comprising the creating the Generic Request Object as a container from the Common Thread Object and populating the Generic Request Object as a container with the Common Thread Object data and running process data.

6. A system comprising computer readable code in a computer storage medium when executing by a processor, said computer readable code adapted to configure and control at least one computer configured and controlled to run a multi-thread process and a single thread process, wherein the single thread process is exclusively invoked by a Common Thread Object, and wherein the system is further controlled to:
   a. invoke a Thread Invocation Object from the running multi-thread process;
   b. create a Generic Request Object as a container and populate the Generic Request Object as a container with Common Thread Object data and running process data for the Common Thread Object; and
   c. pass data from the Generic Request Object to the single thread process via the Common Thread Object to initiate the single thread process.

7. A program product comprising computer readable code in a computer storage medium when executing by a processor, said computer readable code adapted to configure and control a computer to call a single thread process that is exclusively invoked by a Common Thread Object from a running process by a method comprising:
   a. invoking a Thread Invocation Object from the running process;
   b. creating a Generic Request Object and populating the Generic Request Object with Common Thread Object data and running process data for the Common Thread Object wherein the computer readable code is further adapted to create the Generic Request Object as a container and populate the Generic Request Object as a container with the Common Thread Object data and running process data; and
   c. passing data from the Generic Request Object to the single thread process via the Common Thread Object to initiate the single thread process.

8. The program product of claim 7 wherein the computer readable code is further adapted to create the Generic Request Object as a container and populate the Generic Request Object as a container with the Common Thread Object data and running process data.

9. The program product of claim 7 is encrypted and/or compressed for subsequent installation.

* * * * *